(12) United States Patent
Srinivasan et al.

(10) Patent No.: US 11,261,961 B2
(45) Date of Patent: Mar. 1, 2022

(54) METHOD FOR AUTOMATED CALIBRATION AND ADAPTATION OF AUTOMATIC TRANSMISSION CONTROLLERS

(71) Applicant: Ohio State Innovation Foundation, Columbus, OH (US)

(72) Inventors: Krishnaswamy Srinivasan, Columbus, OH (US); Kirti Mishra, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 17/297,755

(22) PCT Filed: Dec. 4, 2019

(86) PCT No.: PCT/US2019/064468
§ 371 (c)(1),
(2) Date: May 27, 2021

(87) PCT Pub. No.: WO2020/117935
PCT Pub. Date: Jun. 11, 2020

(65) Prior Publication Data
US 2022/0018432 A1 Jan. 20, 2022

Related U.S. Application Data

(60) Provisional application No. 62/775,618, filed on Dec. 5, 2018.

(51) Int. Cl.
*F16H 61/02* (2006.01)
*F16H 61/70* (2006.01)

(52) U.S. Cl.
CPC ......... *F16H 61/0213* (2013.01); *F16H 61/70* (2013.01); *F16H 2061/022* (2013.01);
(Continued)

(58) Field of Classification Search
CPC ................ F16H 61/0213; F16H 61/70; F16H 2061/0216; F16H 2061/022;
(Continued)

(56) References Cited

U.S. PATENT DOCUMENTS 5,683,322 A * 11/1997 Meyerle .................. B60T 1/093
475/72
9,156,463 B2 * 10/2015 Legner ............ B60W 30/18072
(Continued)

OTHER PUBLICATIONS

European Patent Office; Search Report and Written Opinion in related International Patent Application No. PCT/US2019/064468 dated Mar. 11, 2020; 10 pages.

*Primary Examiner* — Edwin A Young
(74) *Attorney, Agent, or Firm* — Wood Herron & Evans LLP

(57) ABSTRACT

Methods for automated calibration and adaption of a gearshift controller (39) are disclosed. In one aspect, the method automates calibration a gearshift controller (39) for controlling a sequence of gearshifts in either a stepped automatic transmission equipped with at least one speed sensor mounted on a dynamometer (42) or an automotive vehicle mounted on a dynamometer (42), where the dynamometer (42) is electronically controlled by a dynamometer controller (43). Each gearshift in the sequence includes a first phase, a second phase, . . . and an $N^{th}$ phase. The gearshift controller (39) includes (initial values of) a first phase control parameters set, a second phase control parameters set, . . . and an $N^{th}$ phase control parameters set for each gearshift in the sequence that are updated using a first phase learning controller, a second phase learning controller, . . . and an $N*11$ phase learning controller respectively.

12 Claims, 7 Drawing Sheets

(52) U.S. Cl.
CPC ............... *F16H 2061/0216* (2013.01); *F16H 2061/0225* (2013.01); *F16H 2061/0234* (2013.01)

(58) Field of Classification Search
CPC ..... F16H 2061/0225; F16H 2061/0234; F16H 2061/0062; F16H 2061/0065; F16H 2061/0068; F16H 2061/0087; F16H 59/38; F16H 59/40; F16H 59/42
See application file for complete search history.

(56) References Cited

U.S. PATENT DOCUMENTS

| | | |
|---|---|---|
| 2002/0025885 A1 | 2/2002 | Saito et al. |
| 2010/0250074 A1 | 9/2010 | Hirasako et al. |
| 2010/0262344 A1 | 10/2010 | Fujii et al. |
| 2016/0281845 A1 | 9/2016 | Pietron et al. |

\* cited by examiner

METHOD FOR AUTOMATED CALIBRATION AND ADAPTATION OF AUTOMATIC TRANSMISSION CONTROLLERS

RELATED APPLICATION

This application claims priority to and the filing benefit of U.S. Provisional Patent Application No. 62/775,618, filed on Dec. 5, 2018, the disclosure of which is expressly incorporated by reference herein in its entirety.

TECHNICAL FIELD

This invention relates generally to a method for calibrating and adapting gearshift controllers in automatic transmissions, and more specifically, to a model-based learning method for automating the calibration effort and procedures for adopting this calibration method for adaptation.

BACKGROUND

The calibration of transmission controllers in a controlled lab environment instead of a test track represents front-loading of the calibration effort, as the time and effort spent by a calibration engineer in the vehicle on a test track is dramatically reduced in this method of calibration. Chassis dynamometers are expensive, with only a few of these being available even in big development facilities. Thus, simultaneous development of different vehicle prototypes is inhibited. Front-loading transmission calibration offers many advantages. Such methods allow calibration of transmission controllers before integration of the transmission with the engine and other vehicle systems. Front loading of calibration effort is often done using transmission dynamometers, where gearshifts can be commanded at different operating conditions in a controlled and automated manner. Model-based calibration methods represent a greater degree of calibration front-loading, which can be used even during development of the transmission system.

Minimally, a dynamometer under electronic control for scheduling a preplanned sequence of gearshifts is required for automated calibration of gearshift controllers. The dynamometer can either be a transmission or chassis dynamometer. If done on a chassis dynamometer, typically, the mechanism of securing the vehicle to the ground has a load cell for measuring the vehicle acceleration during a gearshift, which is used for objective evaluation of the shift. The test plans generated by a calibration engineer using design-of-experiments (DoE) approaches are preprogrammed into the dynamometer and using the vehicle sensor data acquired during this automated testing, the calibration parameters, better known as calibration labels, are optimized post-testing for all the allowed gearshifts at different operating conditions. A typical DoE approach involves conducting a gearshift at different control inputs, and choosing the optimum based on objectively evaluated (such as on a scale of 1 to 10) performance indices such as shift spontaneity and shift comfort, collectively represented as shift-quality.

Automatic transmissions with 8, 9, and 10 speeds require much more calibration effort as compared to older transmissions with 4-5 speeds, as the total number of legal/allowed gearshifts increases steeply. For example, a 10-speed GM transmission allowing 26 gearshifts requires 22,000 calibration labels as opposed to 800 calibration labels required by a 4-speed transmission that allows 6 gearshifts. While some of these labels are scalar values, others are two-dimensional look-up tables with multiple values. As described, a typical DoE approach involves conducting a gearshift at different control inputs, resulting in the large number of gearshifts required for the automated calibration of gearshift controllers in transmissions with a greater number of transmission speeds.

The DoE-based calibration method is essentially a combination of modeling (system identification) and optimization (using the identified model), implying that the method used for initial (factory) calibration of a transmission controller cannot be used for adaptation during normal driving, as a model of the system that changes over time due to wear and use is impossible to generate using DoE approaches. This aspect of the DoE-based calibration approach requires additional calibration effort for tuning of the adaptive routines that learn the system behavior, and correct for the changed behavior.

Known methods for automated calibration and adaptation of gearshift controllers indicate that state-of-the-art techniques for automated calibration relies heavily on DoE based approaches, and for adaptation, on rule-based adaptive policies. Very few methods for model-based learning for transmission control exist, which use models of higher complexity, thereby resulting in more complex rules for adaptation, and/or lack a systematic method for computation of learning controllers using the assumed model. These deficiencies makes these methods ineffective to practice.

What is needed is a model-based learning approach resulting in an automated calibration procedure requiring a substantially lower number of gearshifts for transmission control calibration. Such a model-based learning approach may be extended and applied to adaptation of gearshift controllers during vehicle operation.

SUMMARY

In one embodiment, the invention includes a method for automated calibration of a gearshift controller for controlling a sequence of gearshifts in either a stepped automatic transmission equipped with at least one speed sensor mounted on a dynamometer or an automotive vehicle mounted on a dynamometer, where the dynamometer is electronically controlled by a dynamometer controller. Each gearshift in the sequence includes a first phase, a second phase, . . . and an $N^{th}$ phase. The gearshift controller includes (initial values of) a first phase control parameters set, a second phase control parameters set, . . . and an $N^{th}$ phase control parameters set for each gearshift in the sequence that are updated using a first phase learning controller, a second phase learning controller, . . . and an $N^{th}$ phase learning controller respectively. The method includes:

(a) performing the sequence of gearshifts m times in the stepped automatic transmission, or the automotive vehicle with m being a natural number greater than or equal to 1;

(b) acquiring data from the at least one speed sensor for m repetitions of each gearshift in the sequence of gearshifts;

(c) averaging the acquired speed sensor data for m repetitions of each gearshift in the sequence of gearshifts to compute an average speed sensor dataset for each gearshift in the sequence of gearshifts;

(d) determining, using the average speed sensor dataset for each gearshift in the sequence of gearshifts, if the first phase control parameters set in the gearshift controller requires calibration, wherein, if calibration is required, updating the first phase control parameters sets in the gearshift controller that require calibration using the average speed sensor datasets and the first phase learning controller, and if calibration is not required, assigning the gearshifts in the sequence of gearshifts that do not require calibration of the first phase control parameters set to a calibrate gearshift set;

(e) repeating step (d) for each gearshift in the calibrate gearshift set for the second phase control parameters set through $N^{th}$ phase control parameters set until the calibrate gearshift set is found empty; and (f) repeating steps (a)-(e).

The method contemplates different circumstances for terminating step (f). For example, step (f) may be terminated when none of the first phase through $N^{th}$ phase control parameters sets require calibration for any of the gearshifts in the sequence of gearshifts. In another example, wherein the first, second, . . . and $N^{th}$ phase learning controllers are included in a powertrain controller, step (f) may be terminated when none of the first phase through $N^{th}$ phase control parameters sets require calibration for any of the gearshifts in the sequence of gearshifts. In another example, wherein the first, second, . . . and $N^{th}$ phase learning controllers are included in an electronic controller capable of updating the first phase through $N^{th}$ phase control parameters sets in a powertrain controller, step (f) may be terminated when none of the first phase through $N^{th}$ phase control parameters sets require calibration for any of the gearshifts in the sequence of gearshifts. Other termination conditions are identified and discussed below.

In another embodiment, the invention includes a method for adapting a gearshift controller for controlling a gearshift during the operation of an automotive vehicle with a stepped automatic transmission including at least one speed sensor. The gearshift requiring adaptation includes a first phase, a second phase, . . . and an $N^{th}$ phase. The gearshift controller includes (initial values of) a first phase control parameters set, a second phase control parameters set, . . . and an $N^{th}$ phase control parameters set for the gearshift that are updated during vehicle operation using a first, a second, . . . and an $N^{th}$ phase learning controllers included in a powertrain controller respectively. The method includes:

(a) acquiring data from the at least one speed sensor for m repetitions of the gearshift, with m being a natural number greater than or equal to 1;

(b) averaging the speed sensor data for m repetitions of the gearshift to compute an average speed sensor dataset for the gearshift;

(c) determining using the average speed sensor dataset for the gearshift if the first phase control parameters set in the gearshift controller requires adaptation, wherein, if adaption is required, updating the first phase control parameters set in the gearshift controller using the average speed sensor dataset and the first phase learning controller included in the powertrain controller, and if adaption is not required, performing step (d); and (d) repeating step (c) for the second phase control parameters set through $N^{th}$ phase control parameters set.

The method contemplates different scenarios where a gearshift may require adaptation. For example, a gearshift may require adaptation for a power-on upshift using an offgoing clutch and an oncoming clutch. In another example, a gearshift may require adaptation for a power-on downshift using an offgoing clutch and an oncoming clutch.

Other embodiments in accordance with the invention are described below.

BRIEF DESCRIPTION OF THE DRAWINGS

The accompanying drawings, which are incorporated in and constitute a part of this specification, illustrate embodiments of the invention and, with a detailed description of the embodiments given below, serve to explain the principles of the invention.

DETAILED DESCRIPTION

Figure 1:
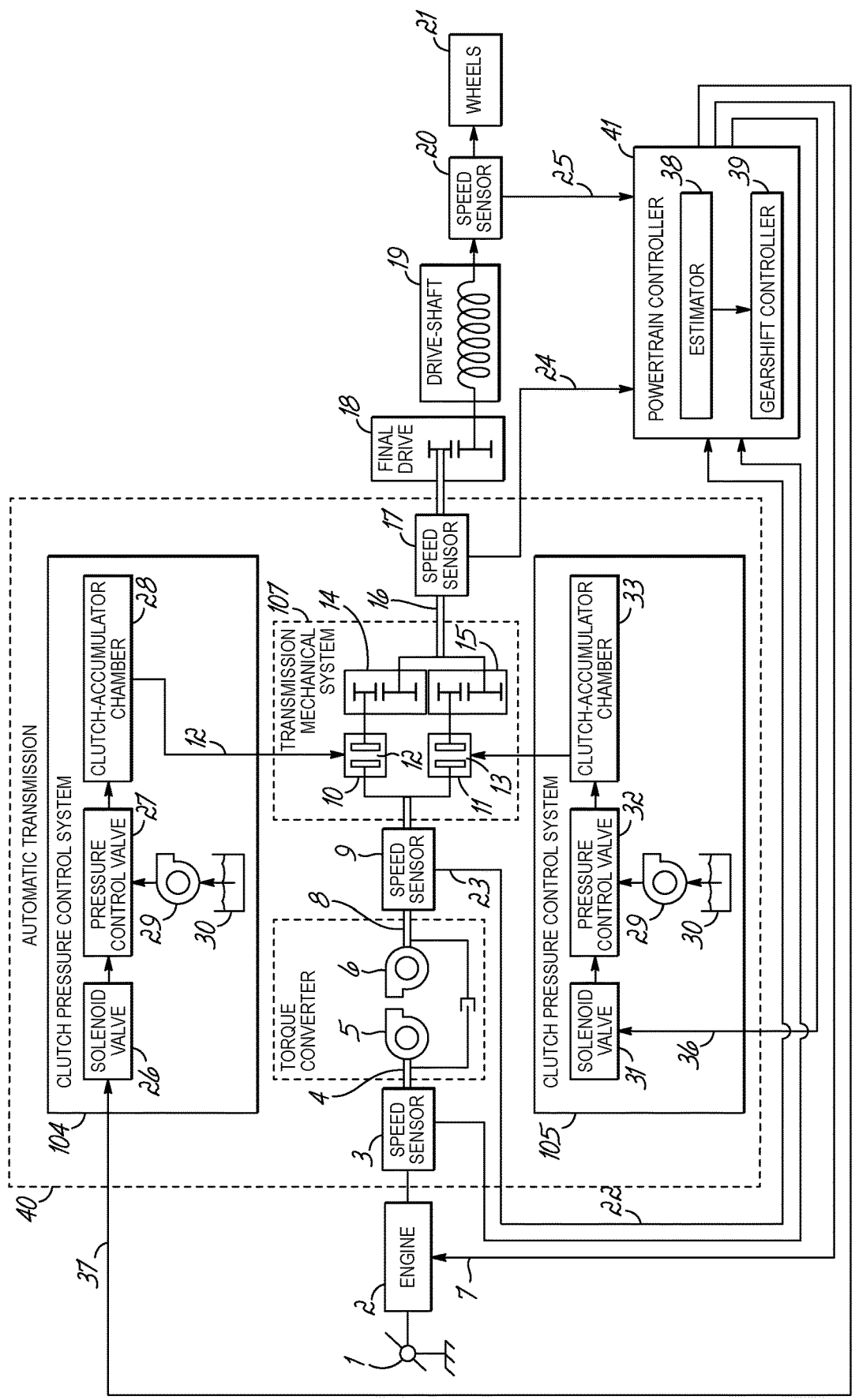
FIG. 1 is a schematic representation of the physical architecture of the automotive powertrain incorporating one embodiment of the invention.

FIG. 1 is a schematic representation of the architecture of a powertrain with an engine 2 as the prime mover, a three-element torque converter with a pump 5 and a turbine 6, a stepped automatic transmission 40 includes a mechanical system 107 and clutch pressure control systems 104 and 105, a final drive planetary gear set 18, a compliant drive shaft 19, and vehicle inertia lumped at wheels 21. In addition to these components, there are speed sensors 3, 9, 17, 20 mounted on the shafts 4, 8, 16, and 19, respectively. These speed sensors 3, 9, 17, 20 send information to a powertrain controller 41 containing a gearshift controller 39 and an estimator 38 that includes mathematical functions coded into an appropriate micro-processor. The speed sensors 3, 9, 17, 20 sense the speeds of the pump 5, the turbine 6, the transmission output, and the wheels 21, respectively. The engine 2 receives throttle angle commands from the driver through the accelerator pedal 1 or, alternatively, a throttle position controller (not shown). The powertrain controller 41, based on calculations to be described later, sends the throttle angle and/or a spark advance command 7 to the engine 2. Also, as will be described later, the powertrain controller 41 performs calculations to generate commands 36, 37 for solenoid valves 31 and 26 controlling an offgoing clutch 11 and an oncoming clutch 10.

With continued reference to FIG. 1, the transmission system 40 consists of a mechanical system 107 and clutch pressure control systems 104 and 105. The mechanical system 107 includes the two clutches involved in a clutch-to-clutch (CTC) shift, more specifically the offgoing clutch 11 and the oncoming clutch 10. Boxes 14 and 15 represent the gear ratios in the paths of the oncoming and offgoing clutches 10, 11. Oncoming and offgoing clutches 10, 11 are manipulated through clutch pressures 12, 13 generated by clutch pressure control systems 104, 105. The clutch pressure control systems 104, 105 include solenoid valves 26, 31, which control pressure control valves 27, 32, which in turn control pressures in the clutch-accumulator chambers 28, 33. The motion of the spools (not shown) in the pressure control valves 27, 32, in conjunction with the main line pressure generated by a pump 29 connected to an oil reservoir 30 modulates the pressures in the clutch-accumulator chamber 28, 33.

Figure 2:
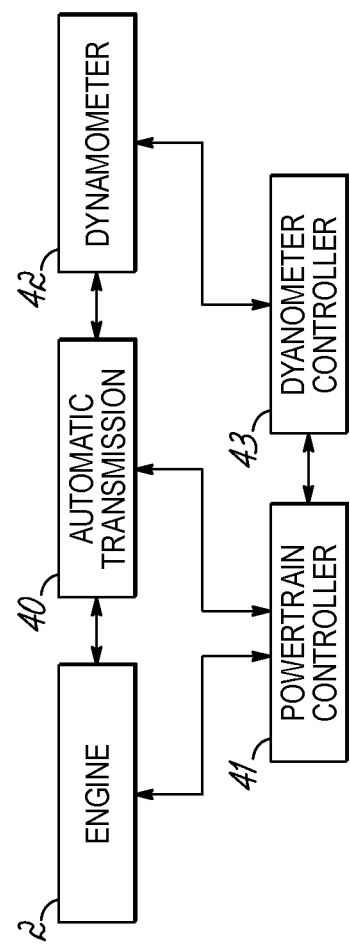
FIG. 2 is a schematic representation of one embodiment of the physical setup required for automated calibration of gearshift controllers.

FIG. 2 is a schematic representation of one embodiment of the physical setup required for implementing the invention. The engine 2 and the automatic transmission 40 are mounted on a dynamometer 42. The load torque generated by the dynamometer 42 is controlled electronically using a dynamometer controller 43, and the power produced by the engine 2 and gear shifting in the automatic transmission 40 are controlled electronically using the powertrain controller 41. The two controllers 41 and 43 coordinate to execute a preplanned sequence of gearshifts in a controlled and automated fashion without any human supervision. In another embodiment, an automotive vehicle is mounted on a chassis dynamometer controlled electronically using a chassis dynamometer controller, which coordinates with a powertrain controller inside the automotive vehicle to automate the execution of a sequence of gearshifts in a stepped automatic transmission of the automotive vehicle.

Figure 3:
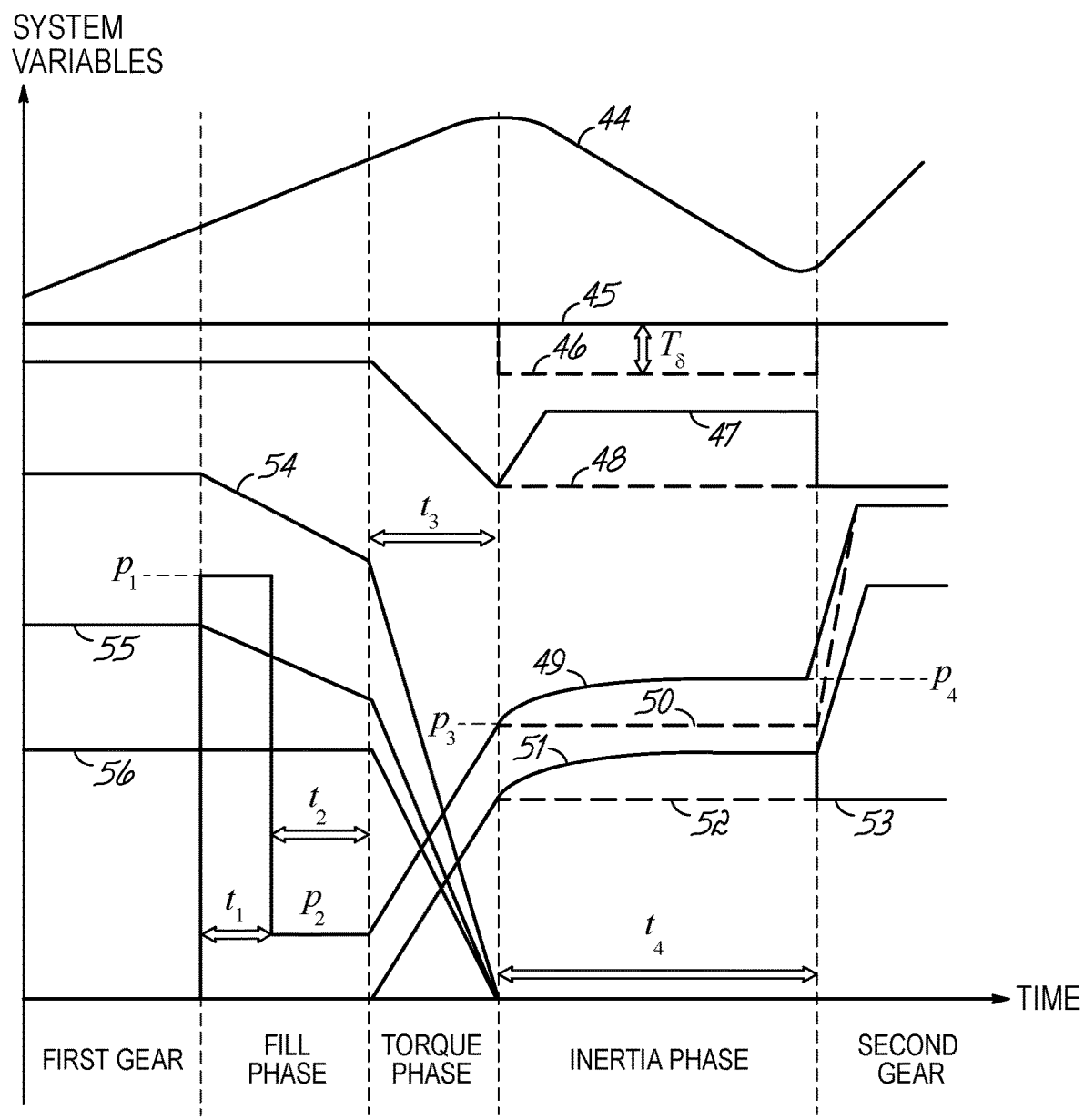
FIG. 3 is a schematic representation of several system variables—engine speed, engine torque, transmission output torque, commanded oncoming and offgoing clutch pressures, and oncoming and offgoing clutch torque capacities and torques, during a power-on 1-2 upshift.

The invention will be described in detail using an example of a power-on upshift, and directions will be given to adopt the described innovation to other type of gearshifts. FIG. 3 is a schematic representation of the primary system variables during a 1-2 power-on upshift for two cases—first, with the constant engine torque command 45 and manipulated oncoming clutch pressure command 49, and second, manipulated engine torque command 46 and constant oncoming clutch pressure command 50 during the inertia phase. The system variables are represented by the solid and dashed lines respectively for the cases with constant and manipulated engine torques. These two methods of gearshift control result in a constant 48 or a variable 47 driveshaft torque and a constant 52 or variable 51 oncoming clutch torques. The offgoing clutch control remains the same for both cases, resulting in the same trajectories of the commanded offgoing clutch pressure 54, offgoing clutch pressure 55, and offgoing clutch torque 56 for both cases.

At the initiation of a power-on upshift, the oncoming clutch is filled with transmission fluid and the clutch piston stroked, reducing the clearance between the plates of the clutch pack to zero, and marking the end of the fill phase. The moment at which the clearance between the clutch plates reduces to zero, or the plates kiss, is called the kiss point. The oncoming clutch starts transmitting torque after the kiss point, which marks the beginning of the torque phase. With reference to FIG. 3, typically, the oncoming clutch pressure command (49, 50 in FIG. 3) during the fill phase includes a sequence involving a higher amplitude pulse followed by a lower amplitude pulse, enabling quick fill followed by gentle stroking of the clutch piston. In FIG. 3, the two pulses are represented by the pairs $(t_1, p_1)$ and $(t_2, p_2)$.

Following the clutch fill phase, the transmission system enters the torque phase, where the oncoming clutch pressure command is ramped-up to a pressure $p_3$ in $t_3$ time units, transferring the load from the offgoing to the oncoming clutch. This is shown by the decreasing offgoing clutch torque 56 during the torque phase, where because load is transferred from the path of higher gear ratio to one with a lower gear ratio, the driveshaft torque 47, 48 drops if the turbine torque is relatively unchanged during the torque phase 45, 46, as shown in FIG. 3. During this phase, the gearshift controller would ideally keep the torque capacity of the offgoing clutch 55 higher than the torque 56 transmitted by it, and reduce it to zero, i.e., fully release the clutch, exactly when the torque transmitted by the offgoing clutch becomes zero, marking the end of the torque phase and the beginning of the inertia phase. While this occurs naturally in older transmissions equipped with one-way clutches, achievement of the same result by electronic control of the offgoing clutch continues to be a challenge, especially in the absence of feedback signals containing information on the progress of the load transfer, due to the absence of torque sensors or even pressure sensors. If the offgoing clutch is released sooner or later than the instant at which the offgoing clutch torque becomes zero, the engine speed flares or is pulled down due to loss or excess of the driving load respectively, both events resulting in a larger drop in the output torque during the gearshift, which leads to loss of passenger comfort.

During the inertia phase, the oncoming clutch pressure command 49 is further increased to $p_4$ in $t_4$ time units, which increases the driveshaft torque 47 and decelerates the engine, resulting in a decrease of engine speed 44, as shown in FIG. 3. Because of kinematic constraints, the deceleration of the engine 2 is reflected in the decrease of the oncoming clutch slip, which goes to zero resulting in clutch lock-up, at which moment the reaction torque 53 (same as 51 during the inertia phase) at the oncoming clutch drops below clutch torque capacity 51, marking the end of the gearshift. If the rate of change of clutch slip speed is large at clutch lock-up, the driveline is excited post lock-up, resulting in low gearshift quality. A gearshift of low quality is characterized by a large change in the vehicle acceleration perceived as jerk by the occupants of an automotive vehicle. A gearshift of low quality can also be characterized by long gearshift duration resulting in low spontaneity and sluggish vehicle response to driver command leading to bad drivability. A gearshift of high quality is characterized by low vehicle jerk and spontaneous vehicle response. Consequently, one of the objectives for inertia phase control is to ensure a smooth clutch lock-up. It is also customary to reduce engine torque 46 during the inertia phase, which results in reduced variation of the output shaft torque 48 during this phase. Integrated control of the engine and hydraulic clutches during a gearshift is referred to as integrated powertrain control.

Figure 4:
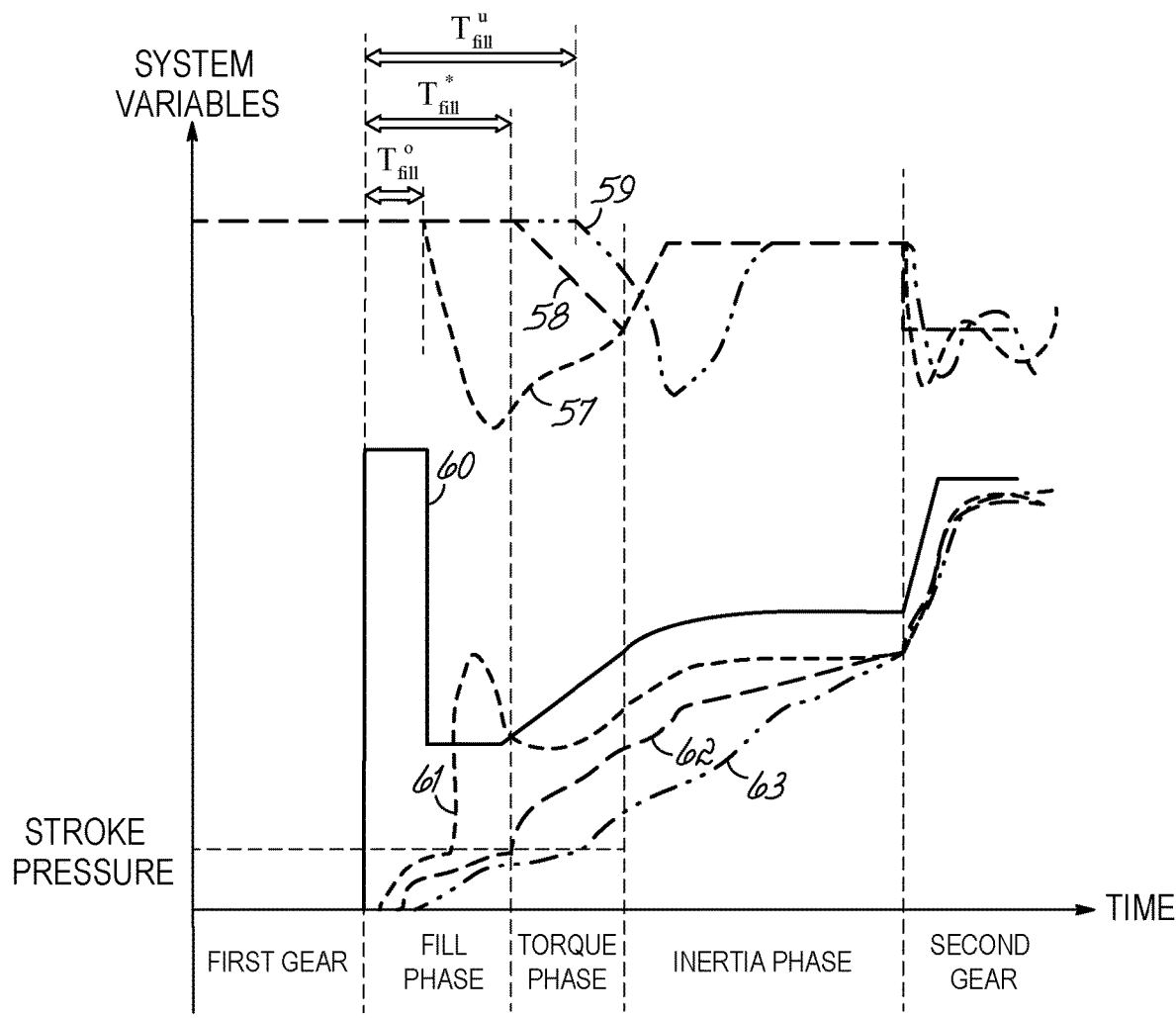
FIG. 4 is a schematic of the transmission output torque, commanded oncoming clutch pressure, and oncoming clutch pressure representing variation in fill phase control.

As part of the method, the offgoing clutch control is assumed calibrated, resulting in reduction of the offgoing clutch torque capacity 55 according to a prescribed set of rates. Using the method for automated calibration and adaptation, the oncoming clutch and engine torque control parameters are iteratively learned to coordinate with this offgoing clutch control resulting in gearshifts of higher quality. More specifically, the control parameters specifying the commanded oncoming clutch pressure and engine torque trajectories, $p_1$-$p_4$, $T_\delta$, and $t_1$-$t_4$, are iteratively learned using a model-based learning technique. For example, three different instances of a gearshift at different points in time during vehicle operation and controlled using the same oncoming clutch pressure command 60 but resulting in three different sets of driveshaft torque and oncoming clutch pressure trajectories—57, 61, and 58, 62, and 59, 63, potentially because of system wear and use over time, are shown in FIG. 4. In FIGS. 4, 57, 61, and 59, 63 represent gearshifts of low quality due to bad fill phase control performance, while 58, 62 represent a gearshift of high quality. Using the method for adaptation, the parameters $t_1$ and/or $p_2$ can be adapted to make the clutch fill durations $T_{fill}^u$ and $T_{fill}^u$ converge to $T_{fill}^*$ iteratively, i.e. over a repeated occurrence of the gearshift of low shift-quality during vehicle operation. The superscripts o, u, and * represent clutch over-fill, under-fill, and ideal-fill respectively. It should be noted that $T_{fill}^* = t_1 + t_2$, implies that if $t_1$ is updated iteratively, $t_2$ must be updated as well to keep $T_{fill}^*$ constant over different gearshifts used for learning.

Figure 5:
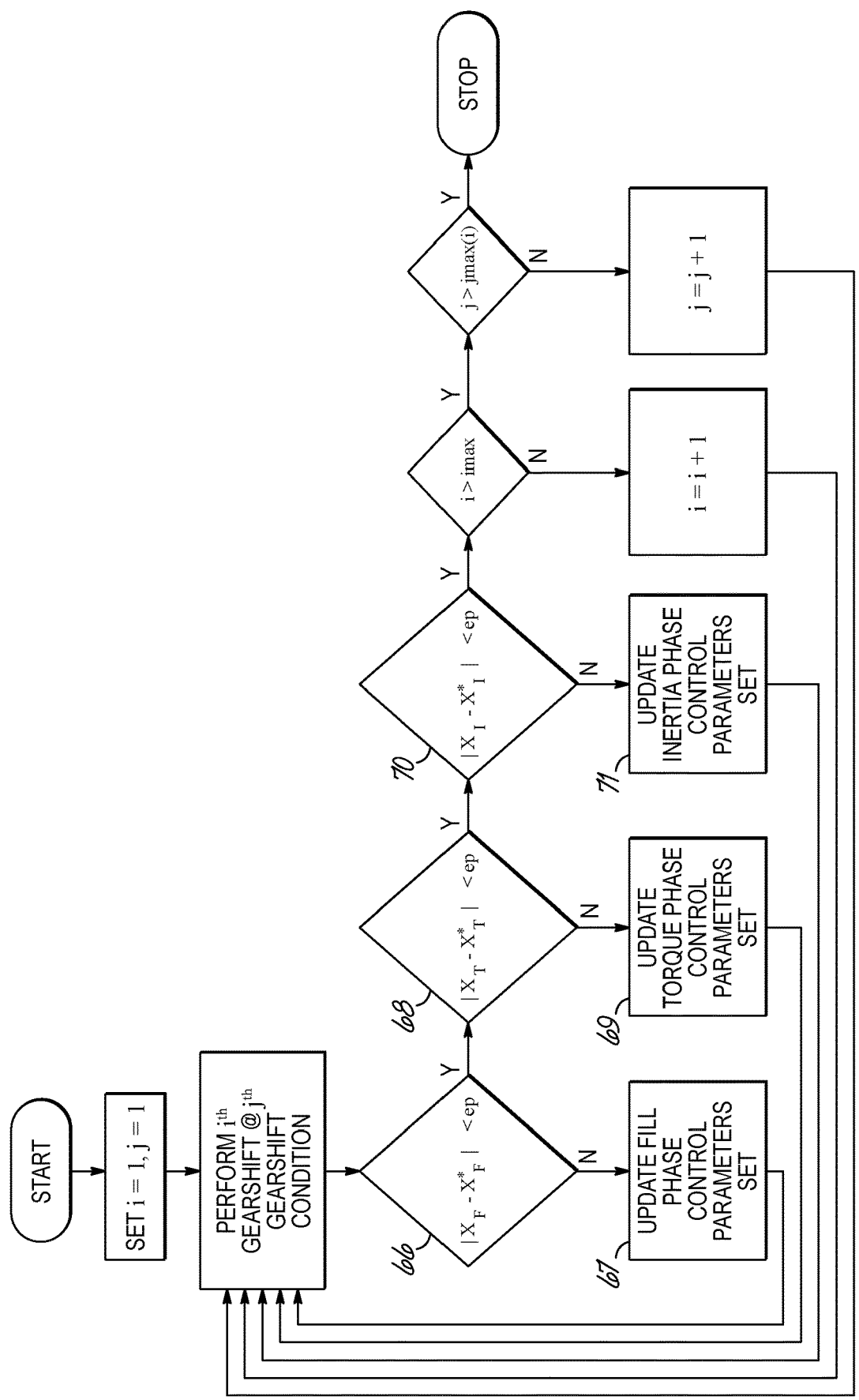
FIG. 5 is a schematic representation of one embodiment of the automated calibration method for power-on upshifts.

One embodiment of the method for automating the calibration of a gearshift controller using the physical setup of FIG. 2 is shown in algorithmic form in FIG. 5, where the fundamental idea of controlling gearshifts in different phases for satisfying different gearshift specifications such as load transfer and speed synchronization is used to develop a systematic calibration procedure applicable to any and all kinds of gearshifts, including those that involve multiple oncoming and offgoing clutches. The central idea is to sequentially calibrate the control parameters sets for the different gearshift phases in the same order as these phases occur. As illustrated in FIG. 5, the three phases of a power-on upshift are calibrated sequentially, i.e., first, the fill phase control parameters set is calibrated, and only when the fill phase performance metric $|X_F - X_F^*| < ep$ in block 66, then the torque phase performance metric $|X_T - X_T^*|$ is checked in block 68, and if needed, then the torque phase control parameters set is updated, and so on.

In FIG. 5, each $i^{th}$ gearshift is performed at $i^{th}$ operating conditions, and using the speed sensors data during the $i^{th}$ gearshift at $i^{th}$ operating conditions, the required control parameters sets are updated. The $i^{th}$ gearshift at $j^{th}$ operating conditions is repeated till none of the control parameters sets for the $i^{th}$ gearshift at $j^{th}$ operating conditions require calibration or update. Following the calibration of control parameters sets for the $i^{th}$ gearshift at $i^{th}$ operating conditions, the next (i+1) allowed gearshift is performed at $i^{th}$ operating conditions. In another embodiment, instead of one allowed gearshift, a sequence of allowed gearshifts may be performed, and using the speed sensors data during this sequence of gearshifts performed, the required control parameters sets for each gearshift in the sequence may be updated. This sequence of gearshifts is performed repetitively until none of the control parameters sets for any of the gearshift in the sequence of gearshifts require calibration or update. After every repetition of this sequence of gearshifts, each gearshift in the sequence must be checked systematically—for general (multi) clutch-to-clutch gearshifts, determining for each gearshift in the sequence of gearshifts performed if the first phase control parameters set in the gearshift controller requires calibration/update, wherein, if calibration/update is required, updating the first phase control parameters sets in a gearshift controller using a first phase learning controller, and if calibration is not required, assigning the gearshifts in the sequence of gearshifts performed that do not require calibration of the first phase control parameters set to a calibrate gearshift set. Then determining for each gearshift in this set if the second phase control parameters set in the gearshift controller requires calibration/update, wherein, if calibration/update is required, updating the second phase control parameters sets in a gearshift controller using a second phase learning controller, and if calibration is not required, assigning the gearshifts in this set that do not require calibration of the second phase control parameters set to a (different) calibrate gearshift set. This systematic process of checking, updating, and assigning is repeated for all N control parameters sets. Once done for all N control parameters sets, the sequence of gearshifts is performed again.

Figure 7:
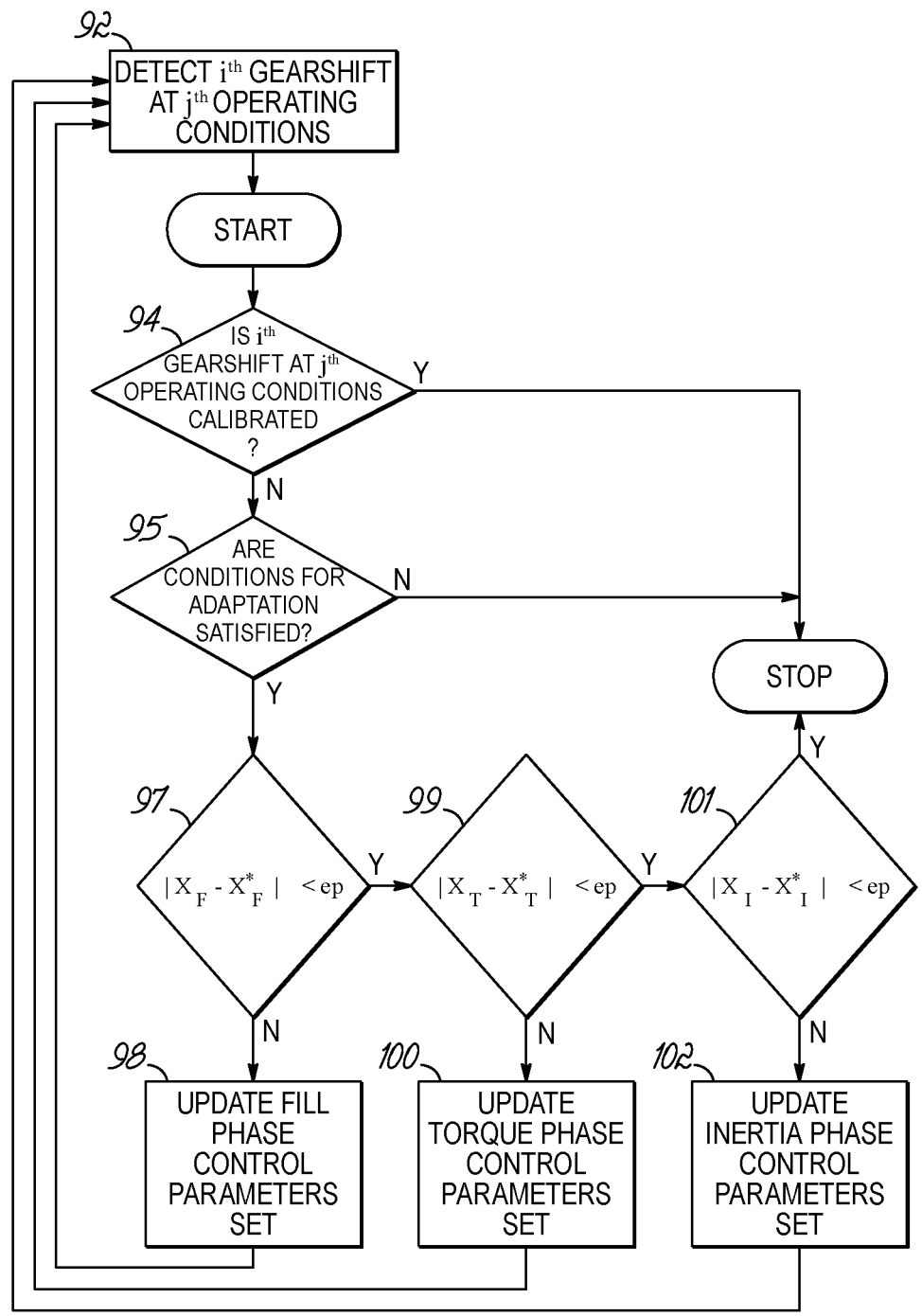
FIG. 7 is a schematic representation of one embodiment of the adaptation method for power-on upshifts.

In one embodiment of the invention, FIGS. 5 and 7 show the calibration and adaptation methods for power-on upshifts. Common to both methods is the sequential nature of calibration, where, first, the fill phase control parameters set is calibrated, followed by the calibration of torque phase control parameters set, which is then followed by the calibration of inertia phase control parameters set. In an embodiment, for power-on downshifts, the inertia phase control parameters set must be calibrated first, followed by the calibration of fill phase control parameters set, which is then followed by the calibration of torque phase control parameters set.

Another embodiment includes general (multi) clutch-to-clutch gearshifts with multiple offgoing and oncoming clutches and including a first, second, . . . $N^{th}$ gearshift phases. A gearshift controller with first, second, . . . $N^{th}$ control parameters sets is used to control such general gearshifts with N phases.

In FIG. 5, the index i represents an allowed gearshift, say 2-3, and runs from 1 to imax. The index j represents an operating condition for $i^{th}$ gearshift in terms of engine torque and vehicle speed, and jmax(i) represents the total number of operating conditions required for calibration of $i^{th}$ gearshift. The control parameters for each allowed gearshift are stored in look-up tables as functions of appropriate system variables. For example, FIG. 6 represents one embodiment of look-up tables for the torque phase control parameter $p_3$ as a function of engine torque and inertia phase control parameter $p_4$ as a function of shift speed, defined as the total engine speed change required during the inertia phase, where the stored values of control parameters in the look-up tables are represented by circular markers. In another embodiment, for general (multi) clutch-to-clutch gearshifts, the first phase through $N^{th}$ phase control parameters sets are stored as look-up tables as functions of appropriate system variables.

With continued reference to FIG. 5, the variables $X_F$, $X_T$, and $X_I$ represent the system outputs during the fill, torque, and inertia phases, respectively, that are required to be close to their respective desired values, represented by asterisks, which are functions of i and j. These can be chosen to be scalars or vectors—if latter, the operator acting on a vector in blocks 66, 68, and 70 in FIG. 5 and blocks 97, 99, and 101 in FIG. 7 is defined as the magnitude of the vector. It should be noted that there is more than one choice for these system outputs. For example, in one embodiment of the method, $X_F$ is chosen to be $T_{fill}$, but equivalently, in another embodiment, it is chosen to be acceleration of the turbine shaft 8 at the end of the fill phase. Similarly, in one embodiment, $X_T$ is chosen to be the (estimated) driveshaft torque trajectory, a vector, and in another embodiment, $X_T$ is chosen to be the (estimated) turbine acceleration trajectory, a different vector. Regardless of the choice of a specific system output, in one way or other, it will be derived using the signals measured by the speed sensors 3, 9, 17, 20 in FIG. 1. In FIG. 5, ep denotes a small positive number, which is required to terminate the iterative learning process, as a zero difference between X and X* will never be possible in practice.

The method for automated calibration of gearshift controllers includes defining a sequence of gearshifts to be performed repetitively in the automatic transmission 40 mounted on the dynamometer 42 using the dynamometer controller 43, and updating the fill phase, torque phase, and inertia phase control parameters sets for each gearshift in the sequence in between two repetitions of the sequence of gearshifts, until all gearshifts in the sequence are accurately calibrated as defined by the convergence of the performance metrics $|X_F - X_F^*|$, $|X_T - X_T^*|$, and $|X_1 - X_1^*|$ to ep, and ideally to zero. For example, for an eight-speed transmission, a typical sequence can be power-on 1-2, 2-3, 3-4, 4-5, 5-6, 6-7, and 7-8 upshifts at the same engine torque level. In order to execute this sequence, the engine 2 is commanded by the powertrain controller 41 in FIG. 2 to produce the required engine torque level, and the speed of the dynamometer 42 is controlled electronically by the dynamometer controller 43, and by controlling the dynamometer speed to increase, the powertrain controller 41 is prompted to command the required sequence of gearshifts in the automatic transmission 40 according to a shift schedule. For this ongoing example, imax=7. In another embodiment, the method calibrates sequentially the first phase, second, . . . and $N^{th}$ phase control parameters sets.

The control parameters sets for different phases of a gearshift are updated using a set of learning controllers, computed using the theory of iterative learning control, an established field for model-based learning. The fundamental idea involves using the tracking or regulation error and control input trajectories from the latest iteration or the last few iterations of a task performed repeatedly, to compute the control input for the next iteration. For the application of gearshift control calibration and adaptation, a learning iteration is defined as the sequence of gearshifts requiring calibration on a dynamometer or isolated gearshifts of low shift-quality occurring during vehicle operation requiring adaptation. If a perfect model of the system relating the tracking or regulation error to the control input is available, the control input producing the desired system response may be calculated using the inverse of this model in one iteration, assuming inversion is possible. As only an approximation of this perfect model is available, more than one iteration or more than on repetition of the sequence of gearshifts to be calibrated or gearshifts requiring adaptation is likely required.

The update rules inside blocks 67, 69, and 71 in FIGS. 5 and 98, 100, and 102 in FIG. 7 calibrate/adapt one or more parameters from a set of control parameters for each phase of the gearshift while maintaining others fixed. For fill phase control parameters set, the parameters $p_1$, $p_2$, $t_1$, and $t_2$, for torque phase control parameters set, the parameters $p_3$ and $t_3$, and for inertia phase control parameters set, the parameters $p_4$, $T_\delta$, and $t_4$ are possible choices for calibration/adaptation. The parameter being updated for calibration/adaptation will be derived from, or be the same as, a generic update variable Y with a subscript for associating it to one of the gearshift phases, for example—$Y_F$ can potentially denote any of the parameters $p_1$, $p_2$, $t_1$, or $t_2$, or alternatively, updated values of any of these can be derived from the updated value of $Y_F$. It is worth pointing out that Y can also represent time trajectories in some parametrization of commanded oncoming clutch and engine torque trajectories, different than that shown in FIG. 3, in which case it will be a vector.

The general update rule used for calibration/adaptation is described in equation (1), where m assume a value F, T, and I for representing fill, torque, and inertia phases control parameters, q denotes the iteration counter for a gearshift represented by the pair (i,j), and $L_m^q$ is the learning controller to be used for calibration/adaptation, which is a scalar if $X_m^q$ is a scalar and is a matrix of appropriate dimensions if $X_m^q$ is a vector. The superscript q indicates that the learning controller may be required to be computed at every learning iteration. The general update rule described in equation (1) is a linear (discrete-time) dynamical system, where the updated value of control parameter for the next learning iteration (q+1) is determined using its value during the last iteration (q) and a correction term generated by the operation of learning controller on system output error $X_m^*-X_m$.

$$Y_m^{q+1}=Y_m^q+L_m^q(X_m^*-X_m^q) \qquad (1)$$

In one embodiment of the update rule in block 67 in FIG. 5 and block 98 in FIG. 7, $Y_F$ is chosen to be $t_1$, $X_F$ is chosen to be $T_{fill}$, and $L_F$, a fill phase learning controller, is computed by assuming a simple model for clutch fill phase with the clutch pressure defined as model output and commanded clutch pressure defined as model input. Motivated from the physics of clutch filling, the model is assumed to be an integrator, and the exact form of $L_F$ is described in equation (2).

$$L_F = \frac{p_2}{p_1 + p_2} \qquad (2)$$

In another embodiment of the update rule in block 67 in FIG. 5 and block 98 in FIG. 7, $Y_F$ is chosen to be $p_2$, $X_F$ is chosen to be $T_{fill}$, and $L_F^q$, an iteration-varying fill phase controller, is computed at every learning iteration by assuming a simple model for clutch fill phase with the clutch pressure defined as model output and commanded clutch pressure defined as model input. Motivated from the physics of clutch filling, the model is assumed to be an integrator, and the exact form of $L_F^q$ is described in equation (3).

$$L_F^q = -\frac{p_2^q}{t_2} \qquad (3)$$

In one embodiment of the update rule in block 69 in FIG. 5 and block 100 in FIG. 7, the parameter $p_3$ is chosen as the last element of a generic update variable $Y_T$, a vector updated using equation (1), and $X_T$ is chosen to be a vector representing the estimated driveshaft torque trajectory during the torque phase of the last iteration. The estimated driveshaft torque trajectory is generated in the form of a vector using the estimator 38 in FIG. 1, and the norm operator ∥ in the decision blocks in FIGS. 5 and 7 represent the magnitude of output error vectors $X_T-X_T^*$. As described earlier, a torque phase learning controller $L_T$ in this case will be a square matrix of dimensions compatible with the dimension of $X_T$, and is computed using a model-based design method that uses a simple model (4) of the torque phase with the driveshaft torque $T_s$ defined as model output and commanded oncoming clutch pressure $p_{onc}^c$ defined as model input. In the differential equation described in (4), $$\frac{d}{dt}$$

represents the derivative with respect to time t, and $\gamma_T$ and $K_T$ are model parameters.

$$\frac{dT_s}{dt} = -\gamma_T T_S + K_T P_{onc}^c \qquad (4)$$

One of the essential assumptions for the application of Iterative Learning Control theory is that the duration of learning iterations should remain the same, and must not change from one learning iteration/trial to the next. The application of torque and inertia phase control calibration/adaptation does not satisfy this fundamental assumption, as the duration of these phases are functions of the control parameters, and as some of these control parameters are updated from one learning iteration to the next, the trial length also changes from one learning iteration to the next. The method for computing $L_T$ is described next, which circumvents the need for the fundamental assumption.

In order to compute $L_T$, the continuous-time model described in equation (4) is represented in a nondimensional time frame $\tau$, which is related to the time-variable t in (4) by the transformation described in equation (5), where $T_T^q$ denotes the duration of torque phase in the time frame t during $q^{th}$ learning iteration. The transformation is a time-scaling of the model in (4), where the time variable t ranges from 0 to $T_T^q$, the nondimensional time variable ranges from 0 to 1, implying that the duration/trial length of learning iterations do not change in the nondimensional time frame, as required by the fundamental assumption described above. However, it must be noted that the transformation in (5) is iteration-varying as $T_T^q$ changes from one iteration to the next, and that the transformation is not known a priori for learning control design.

$$\tau = (T_T^q)^{-1} t \quad (5)$$

The resulting continuous time model in nondimensional time frame T is discretized with a sampling time step $\tau_s$ to obtain the discrete-time model in the nondimensional time frame (6), where k is a discrete-time counter that runs from 0 through N, where N denotes the discrete-time trial length of an iteration in the nondimensional time frame T. As the trial length does not change from one learning iteration to the next in the nondimensional time frame T, N does not have q subscript.

$$T_s(k+1) = (1 + \tau_s T_T^q \gamma_T) T_s(k) + \tau_s T_T^q K_T P_{onc}^c(k) \quad (6)$$

The discrete-time model (6) has variables and parameters that change with respect to the nondimensional discrete-time, represented by k, and learning iterations, represented by q, i.e. it has dynamics with respect to both the time and iteration domains, which makes the learning control design challenging. The discrete-time model (6) having a scalar output $T_s$ is converted into the discrete-time model (7) having a vector output $\overline{T_s}$ defined as $[T_s(1)\ T_s(2) \ldots T_s(N)]^T$, where the superscript T denotes the transpose of a vector or matrix, and a vector input $\overline{P_{onc}^c}$, defined as $[P_{onc}^c(1)\ P_{onc}^c(2) \ldots P_{onc}^c(N)]^T$. In (7), the matrix $H^q$ is a lower triangular Toeplitz matrix, defined as $H(k, 1) = (1+\tau_s T_T^q \gamma_T)^{k-1} (\tau_s T_T^q K_T)$, k=1 ... N. In a lower-triangular Toeplitz matrix, each element of the first column is replicated along a diagonal band—for example, the main diagonal includes H(1,1) all along it, and the diagonal below this main diagonal includes H(2,1) all along it, and so on. It is also easy to see that the first column of $H^q$ is discrete impulse response of length N of the dynamical system in equation (6).

$$\overline{T_s}(q+1) = H^q \overline{P_{onc}^c}(q) \quad (7)$$

The system model $H^q$ includes terms containing $T_T^q$ and its powers. In order to use this model, upper and lower bounds on $T_T^q$ are assumed, i.e. $\underline{T_T^q} < T_T^q < \overline{T_T^q}$, corresponding to which upper and lower bounds for each element of $H^q$, i.e. $\underline{H} < H^q < \overline{H}$ is obtained, where $\underline{H}, \overline{H}$ are matrices of same dimensions as $H^q$, and inequalities are to be understood element-wise.

In one embodiment of the method to compute the torque phase learning controller $L_T$, it is chosen to be a scalar times identity matrix, i.e., $L_T = l_1 I$, where $l_1$ is the scalar and I represents the identity matrix of appropriate dimensions. The scalar parameter is computed as described in (8) to ensure convergence of $X_T$ to $X_T^*$ iteratively in a few learning iterations.

$$0 < l_1 < \overline{H}(1,1)\ \text{if}\ \underline{H}(1,1) > 0, \text{or}\ \underline{H}(1,1) < l_1 < 0\ \text{if}\ \overline{H}(1,1) < 0 \quad (8)$$

In another embodiment of the method to compute the torque phase learning controller $L_T$, the matrix inequality in (9) is numerically solved to compute $L_T$. In one embodiment, the matrix inequality in (9) is converted to a set of linear matrix inequalities that can be solved efficiently using freely available numerical solvers.

$$(1-L_T H^q)^T (I-L_T H^q) < I, \forall H^q: \underline{H} < H^q < \overline{H} \quad (9)$$

In one embodiment of the update rule in block 71 in FIG. 5 and block 102 in FIG. 7, the parameter $p_4$ is chosen as the last element of a generic update variable $Y_I$, a vector updated using equation (1), and $X_I$ is chosen to be a vector representing the measured oncoming clutch slip speed during the inertia phase of the last iteration. As was the case with torque phase update rule, an inertia phase learning controller $L_I$ in this case will be a square matrix of dimensions compatible with the dimension of $X_I$, and is computed using a model-based design method that uses a simple model (10) of the inertia phase with the oncoming clutch slip speed $\omega_{onc}$ defined as model output and commanded oncoming clutch pressure $P_{onc}^c$ defined as model input. In the differential equation described in (10), $$\frac{d}{dt}$$

represents the derivative with respect to time t, and $\gamma_I$ and $K_I$ are model parameters. Proceeding similar to the method described for computation of the learning controller $L_T$, two embodiments of the method for computation of inertia phase learning controller $L_I$ are obtained.

$$\frac{d\omega_{onc}}{dt} = -\gamma_I \omega_{onc} + K_I P_{onc}^c \quad (10)$$

In another embodiment, the parameter chosen for update is $T_\delta$, and following similarly as above, two embodiments of the inertia phase learning controller $L_I$ is computed to update the parameter $T\delta$ iteratively in the update rule in block 71 in FIG. 5 and block 102 in FIG. 7. Towards that end, the update parameter $T\delta$ is chosen as the minimum element of the generic update variable $Y_I$, a vector updated using equation (1), and $X_I$ is chosen to be a vector representing the measured oncoming clutch slip speed during the inertia phase of the last iteration. The learning controller $L_I$ in this case will be a square matrix of dimensions compatible with the dimension of $X_I$, and is computed similarly to the procedure described for torque phase control calibration, which uses a simple model (11) of the inertia phase with the oncoming clutch slip speed $\omega_{onc}$ defined as model output and commanded engine torque $T_e^c$ defined as model input. In the differential equation described in (11), $$\frac{d}{dt}$$

represents the derivative with respect to time t, and $\hat{\gamma}_I$ and $\hat{K}_I$ are model parameters.

$$\frac{d\omega_{onc}}{dt} = -\hat{\gamma}_I \omega_{onc} + \hat{K}_I T_e^c \qquad (11)$$

In another embodiment, for general (multi) clutch-to-clutch gearshifts including a first, second, ... $N^{th}$ gearshift phases, a first, second, ... $N^{th}$ phase learning controllers are used to update a first, second, ... $N^{th}$ control parameters sets in a gearshift controller used to control such general gearshifts with N phases.

The invention contemplates adopting the method for automated calibration of gearshift controllers using the physical setup shown in FIG. 2 for the application of adaptation of gearshift controllers in an automotive vehicle during vehicle operation. The fundamental difference between automated calibration using a dynamometer and adaptation in a vehicle is that on the dynamometer, the sequence of gearshifts to be calibrated can be reproduced accurately for iterative learning of the desired control parameters, whereas in a vehicle, during normal driving, the gearshifts are commanded as a consequence of driver's action.

Figure 6B:
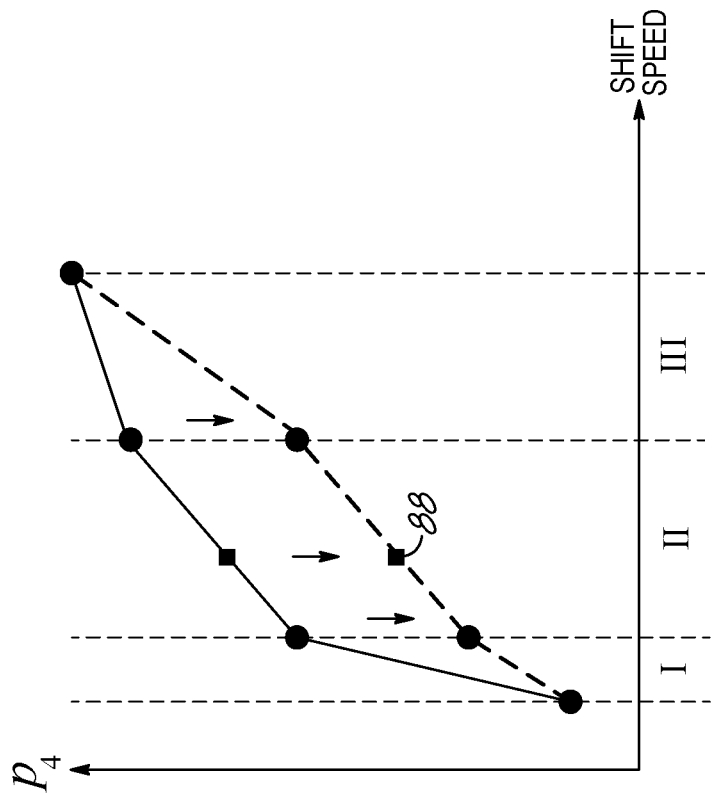
FIGS. 6A and 6B are schematic representations of one embodiment of the look-up tables storing oncoming clutch control parameters as functions of engine torque and speed.
Figure 6A:
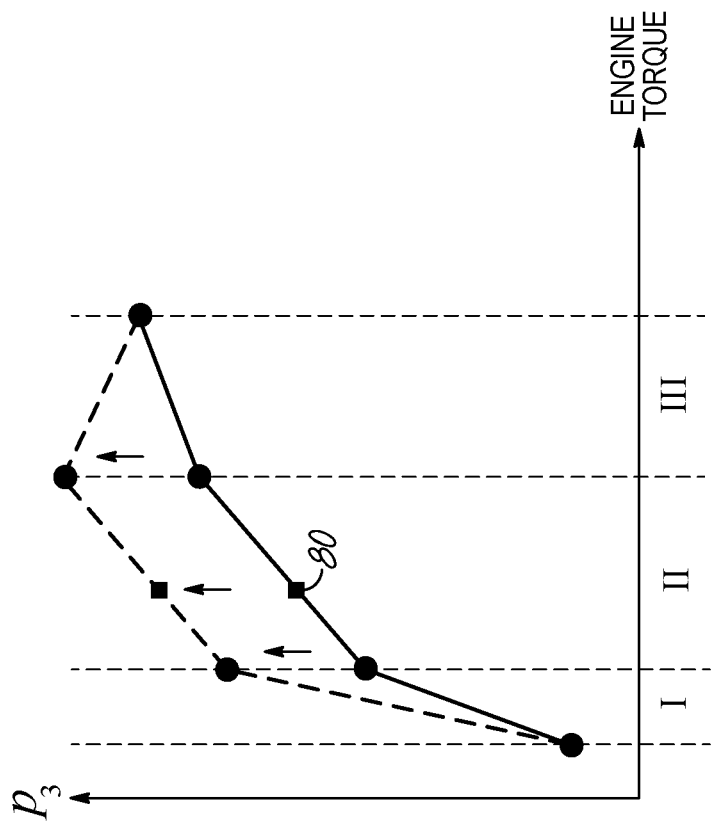

The fundamental difference between calibration and adaptation functions described above requires that a gearshift of low shift-quality during vehicle operation must be analyzed and relevant control parameters must be updated. One embodiment of the method capable of this is described using the look-up tables in FIGS. 6A and 6B. As described earlier, the control parameters such as $p_3$ and $p_4$ are stored as functions of appropriate operating variables, see FIGS. 6A and 6B, where the solid and dashed lines represent the respective look-up tables before and after adaptation—a gearshift of low quality is detected at the operating conditions corresponding to the square markers 80 and 88 in FIGS. 6A and 6B. Once detected, the learning controllers $L_T$ and $L_1$ developed for automated calibration are used to update the values of $p_3$ and $p_4$ at the operating condition at which the gearshift of low shift-quality was detected. However, as shown in FIGS. 6A and 6B, the look-up tables only store the control parameters $p_3$ and $p_4$ at operating conditions (represented by circular markers) around this operating condition requiring control parameters update. The control parameters corresponding to the operating conditions surrounding the operating condition requiring parameters update may be updated as shown by the arrows in FIGS. 6A and 6B.

The procedure to update look-up tables described in the preceding paragraph is the only difference between the update torque phase control parameters set blocks, 69 and 100, and the update inertia phase control parameters set blocks, 71 and 102, in FIGS. 5 and 7. As fill phase control parameters are stored as functions of clutches and not operating conditions of engine torque and shift speed, the update fill phase calibration parameters set blocks 67 and 98 are identical in FIGS. 5 and 7.

The method for online adaptation of gearshift controllers is described next. After an $i^{th}$ gearshift at $i^{th}$ operating conditions is completed, detected by block 92, the shift-quality of this completed gearshift is checked in block 94 using the performance metrics $|X_F-X_F^*|$, $|X_T-X_T^*|$, and $|X_I-X_I^*|$, and if either of the three is found to be greater than ep, the $i^{th}$ gearshift at $i^{th}$ operating conditions is declared to require adaptation of one or more control parameters sets. Before proceeding to apply the update rules in blocks 98, 100, and 102 described earlier, the minimum values of throttle position change and Automatic Transmission Fluid (ATF) temperature during the $i^{th}$ gearshift at $i^{th}$ operating conditions are checked in block 95, and only if found to be close to zero and more than a threshold respectively, the relevant control parameters are updated in blocks 98, 100, and 102.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method for automated calibration of a gearshift controller (39) for controlling a sequence of gearshifts in either a stepped automatic transmission (40) equipped with at least one speed sensor (3, 9, 17, 20) mounted on a dynamometer (42) or an automotive vehicle mounted on a dynamometer (42), where the dynamometer (42) is electronically controlled by a dynamometer controller (43), each gearshift in the sequence includes a first phase, a second phase, ... and an $N^{th}$ phase, and the gearshift controller (39) includes (initial values of) a first phase control parameters set, a second phase control parameters set, ... and an $N^{th}$ phase control parameters set for each gearshift in the sequence that are updated using a first phase learning controller, a second phase learning controller, ... and an $N^{th}$ phase learning controller respectively, the method comprising:

(a) performing the sequence of gearshifts m times in the stepped automatic transmission (40), or the automotive vehicle with m being a natural number greater than or equal to 1;

(b) acquiring data from the at least one speed sensor (3, 9, 17, 20) for m repetitions of each gearshift in the sequence of gearshifts;

(c) averaging the acquired speed sensor data for m repetitions of each gearshift in the sequence of gearshifts to compute an average speed sensor dataset for each gearshift in the sequence of gearshifts;

(d) determining, using the average speed sensor dataset for each gearshift in the sequence of gearshifts, if the first phase control parameters set in the gearshift controller (39) requires calibration, wherein, if calibration is required, updating the first phase control parameters sets in the gearshift controller (39) that require calibration using the average speed sensor datasets and the first phase learning controller, and if calibration is not required, assigning the gearshifts in the sequence of gearshifts that do not require calibration of the first phase control parameters set to a calibrate gearshift set;

(e) repeating step (d) for each gearshift in the calibrate gearshift set for the second phase control parameters set through $N^{th}$ phase control parameters set until the calibrate gearshift set is found empty; and (f) repeating steps (a)-(e).

2. The method of claim 1, further comprising:
terminating step (f) when none of the first phase through $N^{th}$ phase control parameters sets require calibration for any of the gearshifts in the sequence of gearshifts.

3. The method of claim 1, wherein the first, second, . . . and $N^{th}$ phase learning controllers are included in a powertrain controller (41), the method further comprising:
terminating step (f) when none of the first phase through $N^{th}$ phase control parameters sets require calibration for any of the gearshifts in the sequence of gearshifts.

4. The method of claim 1, wherein the sequence of gearshifts includes power-on upshifts, each power-on upshift uses an offgoing clutch (11) and an oncoming clutch (10),
wherein the first phase of each power-on upshift being a fill phase, the second phase of each power-on upshift being a torque phase, the third phase of each power-on upshift being an inertia phase,
wherein the first phase control parameters set for each power-on upshift being a fill phase control parameters set, the second phase control parameters set for each power-on upshift being a torque phase control parameters set, the third phase control parameters set for each power-on upshift being an inertia phase control parameters set, and
wherein the third phase learning controller being an inertia phase learning controller computed using an inertia phase model transformed to a nondimensional time frame, the second phase learning controller being a torque phase learning controller computed using a torque phase model transformed to a nondimensional time frame, and the first phase learning controller being a fill phase learning controller computed as $$L_F = \frac{p_2}{p_1 + p_2},$$

the method further comprising:
terminating step (f) when none of the fill phase control parameters sets, torque phase control parameters sets, and inertia phase control parameters sets require calibration for any of the gearshifts in the sequence of gearshifts.

5. The method of claim 1, wherein the sequence of gearshifts includes power-on downshifts, each power-on downshift uses an offgoing clutch (11) and an oncoming clutch (10),
wherein the first phase of each power-on downshift being an inertia phase, the second phase of each power-on downshift being a fill phase, the third phase of each power-on downshift being a torque phase,
wherein the first phase control parameters set for each power-on downshift being an inertia phase control parameters set, the second phase control parameters set for each power-on downshift being a fill phase control parameters set, the third phase control parameters set for each power-on downshift being a torque phase control parameters set, and
wherein the first phase learning controller being an inertia phase learning controller computed using an inertia phase model transformed to a nondimensional time frame, the third phase learning controller being a torque phase learning controller computed using a torque phase model transformed to a nondimensional time frame, and the second phase learning controller being a fill phase learning controller computed as $$L_F = \frac{p_2}{p_1 + p_2},$$

the method further comprising:
terminating step (f) when none of the fill phase control parameters sets, torque phase control parameters sets, and inertia phase control parameters sets require calibration for any of the gearshifts in the sequence of gearshifts.

6. The method of claim 1, wherein the sequence of gearshifts includes power-on upshifts, each power-on upshift uses an offgoing clutch (11) and an oncoming clutch (10),
wherein the first phase of each power-on upshift being a fill phase, the second phase of each power-on upshift being a torque phase, the third phase of each power-on upshift being an inertia phase,
wherein the first phase control parameters set for each power-on upshift being a fill phase control parameters set, the second phase control parameters set for each power-on upshift being a torque phase control parameters set, the third phase control parameters set for each power-on upshift being an inertia phase control parameters set, and
wherein the third phase learning controller being an inertia phase learning controller computed using an inertia phase model transformed to a nondimensional time frame, the second phase learning controller being a torque phase learning controller computed using a torque phase model transformed to a nondimensional time frame, and the first phase learning controller being a fill phase learning controller computed as $$L_F^q = -\frac{p_2^q}{t_2},$$

the method further comprising:
terminating step (f) when none of the fill phase control parameters sets, torque phase control parameters sets, and inertia phase control parameters sets require calibration for any of the gearshifts in the sequence of gearshifts.

7. The method of claim 1, wherein the sequence of gearshifts includes power-on downshifts, each power-on downshift uses an offgoing clutch (11) and an oncoming clutch (10),
wherein the first phase of each power-on downshift being an inertia phase, the second phase of each power-on downshift being a fill phase, the third phase of each power-on downshift being a torque phase,
wherein the first phase control parameters set for each power-on downshift being an inertia phase control parameters set, the second phase control parameters set for each power-on downshift being a fill phase control parameters set, the third phase control parameters set for each power-on downshift being the torque phase control parameters set, and
wherein the first phase learning controller being an inertia phase learning controller computed using an inertia phase model transformed to a nondimensional time frame, the third phase learning controller being a torque phase learning controller computed using a torque phase model transformed to a nondimensional time frame, and the second phase learning controller being a fill phase learning controller computed as $$L_F^q = -\frac{p_2^q}{t_2},$$

the method further comprising:
terminating step (f) when none of the fill phase control parameters sets, torque phase control parameters sets, and inertia phase control parameters sets require calibration for any of the gearshifts in the sequence of gearshifts.

8. A method for adapting a gearshift controller (39) for controlling a gearshift during the operation of an automotive vehicle with a stepped automatic transmission (40) including at least one speed sensor (3, 9, 17, 20), the gearshift requiring adaptation includes a first phase, a second phase, . . . and an N$^{th}$ phase, and the gearshift controller (39) includes (initial values of) a first phase control parameters set, a second phase control parameters set, . . . and an N$^{th}$ phase control parameters set for the gearshift that are updated during vehicle operation using a first, a second, . . . and an N$^{th}$ phase learning controllers included in a powertrain controller (41) respectively, the method comprising:

(a) acquiring data from the at least one speed sensor (3, 9, 17, 20) for m repetitions of the gearshift, with m being a natural number greater than or equal to 1;

(b) averaging the speed sensor data for m repetitions of the gearshift to compute an average speed sensor dataset for the gearshift;

(c) determining using the average speed sensor dataset for the gearshift if the first phase control parameters set in the gearshift controller (39) requires adaptation, wherein,
if adaption is required, updating the first phase control parameters set in the gearshift controller (39) using the average speed sensor dataset and the first phase learning controller included in the powertrain controller (41),
and if adaption is not required, performing step (d); and (d) repeating step (c) for the second phase control parameters set through N$^{th}$ phase control parameters set.

9. The method of claim 8, wherein the gearshift requiring adaptation is a power-on upshift using an offgoing clutch (11) and an oncoming clutch (10),
wherein the first phase being a fill phase, the second phase being a torque phase, the third phase being an inertia phase, and
wherein the third phase learning controller being an inertia phase learning controller computed using an inertia phase model transformed to a nondimensional time frame, the second phase learning controller being a torque phase learning controller computed using a torque phase model transformed to a nondimensional time frame, and the first phase learning controller being a fill phase learning controller computed as $$L_F = \frac{p_2}{p_1 + p_2}.$$

10. The method of claim 8, wherein the gearshift requiring adaptation is a power-on downshift using an offgoing clutch (11) and an oncoming clutch (10),
wherein the first phase being an inertia phase, the second phase being a fill phase, the third phase being a torque phase, and
wherein the first phase learning controller being an inertia phase learning controller computed using an inertia phase model transformed to a nondimensional time frame, the third phase learning controller being a torque phase learning controller computed using a torque phase model transformed to a nondimensional time frame, and the second phase learning controller being a fill phase learning controller computed as $$L_F = \frac{p_2}{p_1 + p_2}.$$

11. The method of claim 8, wherein the gearshift requiring adaptation is a power-on upshift using an offgoing clutch (11) and an oncoming clutch (10),
wherein the first phase being a fill phase, the second phase being a torque phase, the third phase being an inertia phase,
wherein the third phase learning controller being an inertia phase learning controller computed using an inertia phase model transformed to a nondimensional time frame, the second phase learning controller being a torque phase learning controller computed using a torque phase model transformed to a nondimensional time frame, and the first phase learning controller being a fill phase learning controller computed as $$L_F^q = -\frac{p_2^q}{t_2}.$$

12. The method of claim 8, wherein the gearshift requiring adaptation is a power-on downshift using an offgoing clutch (11) and an oncoming clutch (10),
wherein the first phase being an inertia phase, the second phase being a fill phase, the third phase being a torque phase, and
wherein the first phase learning controller being an inertia phase learning controller computed using an inertia phase model transformed to a nondimensional time frame, the third phase learning controller being a torque phase learning controller computed using a torque phase model transformed to a nondimensional time frame, and the second phase learning controller being a fill phase learning controller computed as $$L_F^q = -\frac{p_2^q}{t_2}.$$

\* \* \* \* \*